Patented Aug. 28, 1934

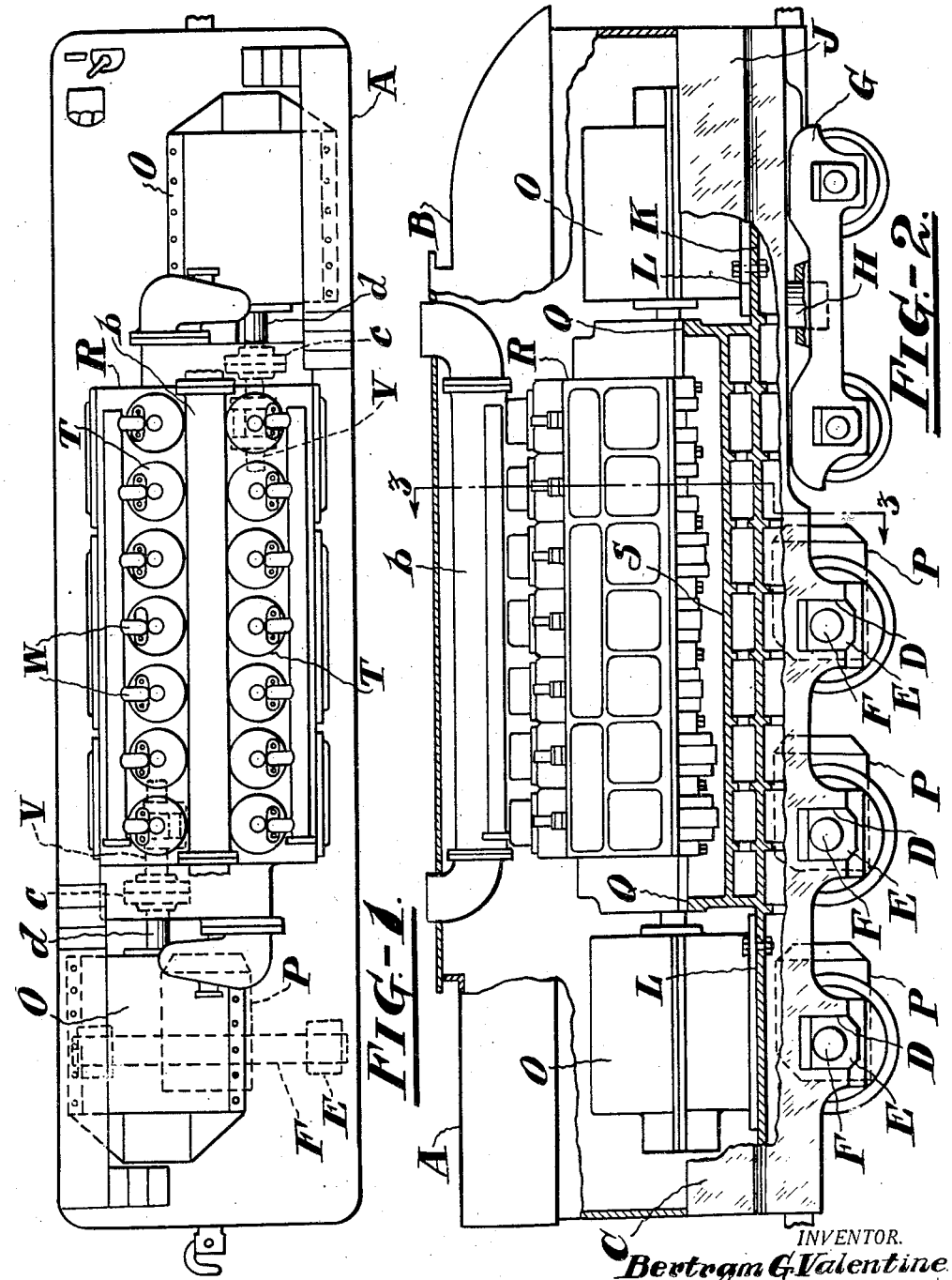

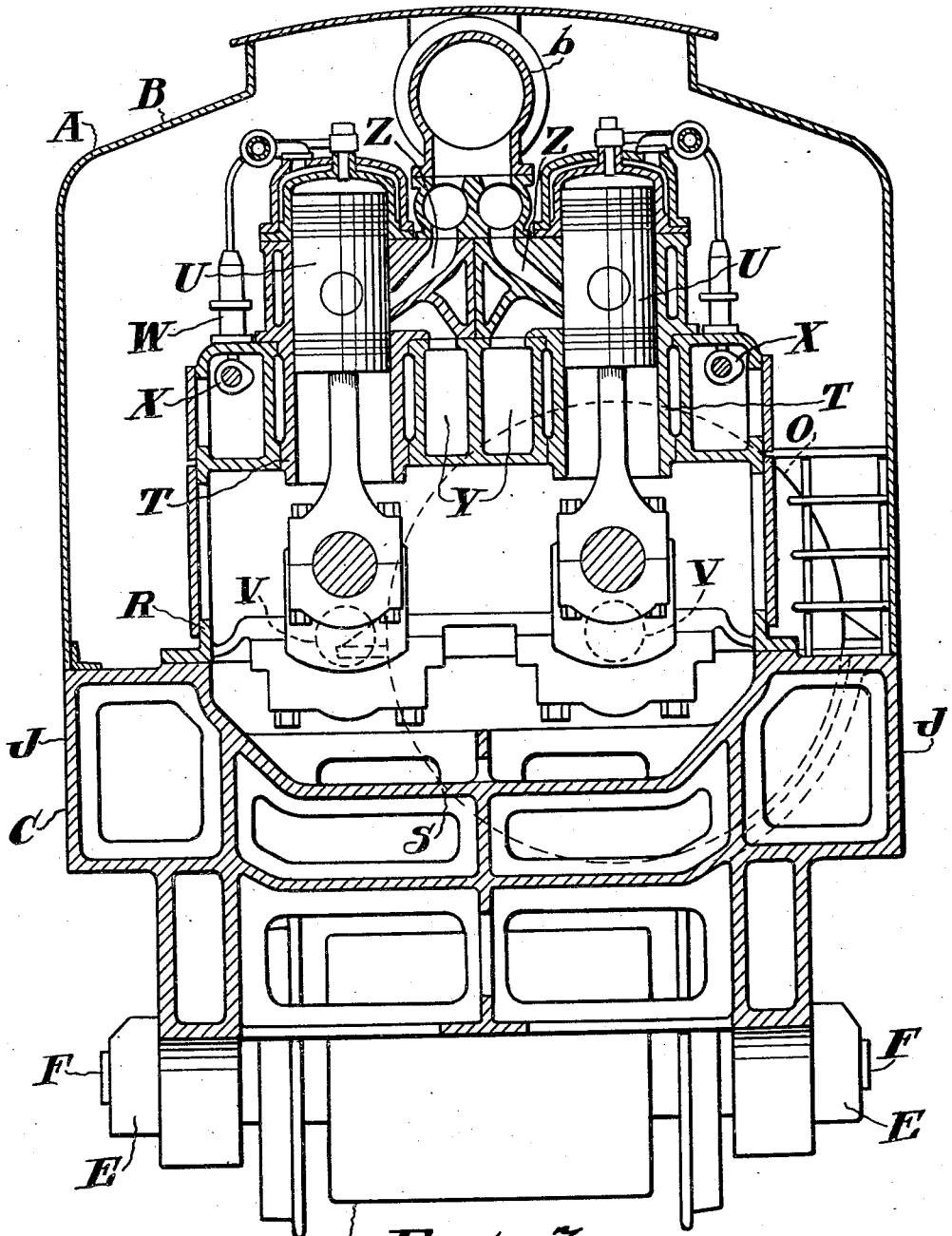

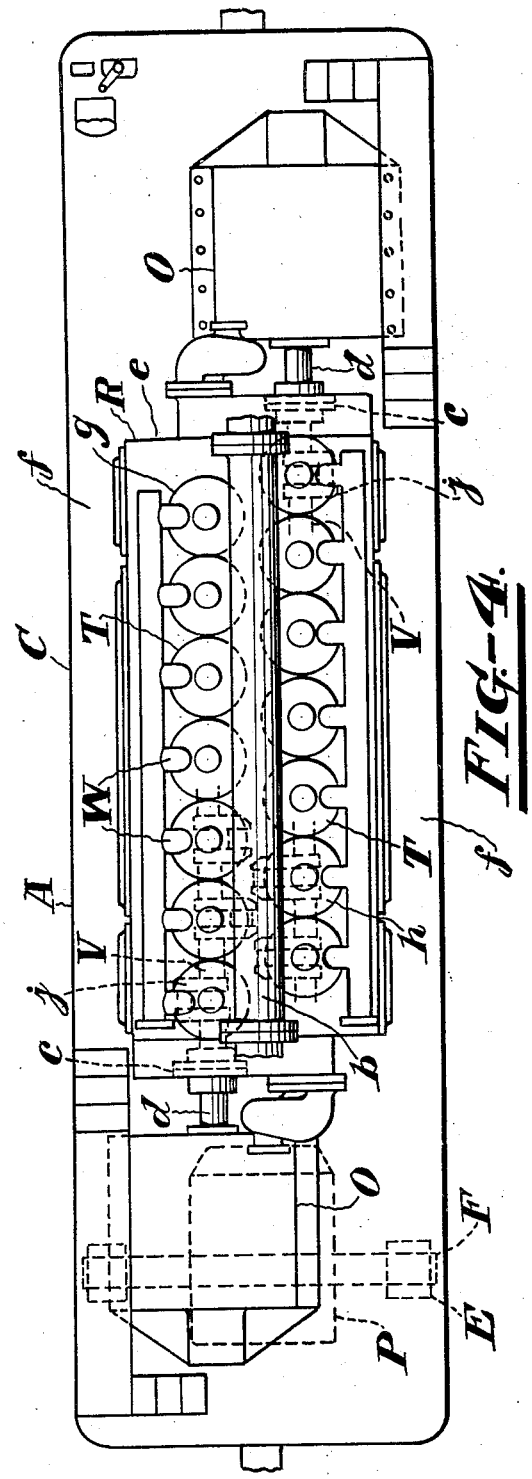

1,971,998

UNITED STATES PATENT OFFICE 1,971,998

LOCOMOTIVE

Bertram G. Valentine, Phillipsburg, N. J., assignor to Ingersoll-Rand Company, Jersey City, N. J., a corporation of New Jersey Application November 11, 1932, Serial No. 642,159

3 Claims. (Cl. 60—97)

This invention relates to locomotives, and more particularly to an electric locomotive of the self-contained type equipped with prime movers and generators actuated thereby for generating the current supply to the driving motors.

One object of the invention is to effect a convenient and compact arrangement of the prime movers and generators within a small space or housing.

Another object is to assure rigidity of the means or members through which the driving force of the motors is transmitted to the train coupled to the locomotive, and a further object is to minimize the number of parts contained in the organization of the locomotive.

Other objects will be in part obvious and in part pointed out hereinafter.

In the accompanying drawings illustrating the invention and in which similar reference characters refer to similar parts, Figure 1 is a plan view of the locomotive with the cab removed and showing the power generating devices, Figure 2 is a side elevation of the locomotive, partly broken away, Figure 3 is a transverse elevation in section taken through Figure 2 on the line 3—3 looking in the direction indicated by the arrows, and Figure 4 is a view similar to Figure 1 showing a modified form of the invention.

Referring more particularly to the drawings, the locomotive, which is designated in general by A, comprises the usual cab or housing B which is mounted in the present instance directly upon and supported by a truck frame C.

The truck frame C extends throughout the entire length of the locomotive. It is a unitary rigid structure provided in its lower surface with a series of recesses D, in this instance three, for the accommodation of journal boxes E wherein the driving axles F are journalled.

The axles F are arranged in suitably spaced relation with respect to each other along about one half the length of the locomotive. In other words, the innermost of a series of axles preferably lies about midway between the ends of the frame C, and the portion of the locomotive or frame C extending beyond the innermost axle is supported by a pilot truck G which may be connected to the frame C by a center bearing H, as is customary.

Constructed according to the practice of the invention, the frame C comprises a pair of box-like members J which extend longitudinally of and lie on opposite sides of the frame. The members J are joined at their lowermost extremities by a wall K which may extend along the entire length of the frame C. The outer ends or portions of the wall constitute seating surfaces L for generators O which generate electrical current for the traction motors P which are operatively connected to the axles F for driving the locomotive.

At the inner ends of the seating surfaces L, walls or cross-ribs Q are joined to the wall K and the members J and cooperate with the latter to support the casing R which is a part of the prime movers whereby the generators O are driven. Forming an integral part of the frame C and arranged at a higher elevation than the wall K is a second wall S which is joined to the cross-ribs Q and to the members J to serve as a crank pan for the prime mover.

The power device for driving the generators consists of two engines housed by the same casing R. The casing R is accordingly provided with two longitudinally extending rows of cylinders T having pistons U for actuating a pair of crank shafts V arranged on opposite sides and equi-distantly from the longitudinal center line of the frame C and wherewith the longitudinal center line of the casing R may coincide. The engines are of the Diesel type into which the fuel is introduced by suitable injection devices W of which one may be provided for each cylinder. The fuel devices may be operated by cam shafts X operated in a well known manner and arranged, as shown, in the opposite sides of the casing R.

The air for oxygenizing the fuel may be conveyed to the cylinders T by passages Y arranged between the rows of cylinders, and the exhaust gases are conveyed, by passages Z, from the cylinders to an exhaust manifold $b$ located on top of the casing R and between the rows of cylinders T.

Although certain elements, such as the exhaust manifold, serve both engines, the engines may be operated independently of each other or simultaneously, depending upon the demands of the driving motors P. In other words, each crank shaft, together with the pistons connected thereto, may be considered as a separate prime mover, notwithstanding the fact that these elements are all housed by the same casing. In order to make possible this mode of operation one end of one crank shaft V projects from one end of the casing R and is connected directly, as by means of a coupling $c$, to the shaft $d$ of a generator O which is arranged coaxially with the crank shaft to which it is connected.

In order to bring about a similar arrangement between the other crank shaft V and the generator which it drives, said crank shaft extends with an end through the opposite end of the casing R and is connected directly to the generator shaft *d* by a coupling *c*.

As will be readily appreciated, a locomotive constructed in accordance with the present invention assures a desired rigidity of the element, in this instance the frame C, through which the driving power of the motors P is transmitted to a train connected to the locomotive. By mounting the power devices directly upon the truck frame the overall height of the locomotive will be considerably less than in structures embodying separate truck and main frames.

Another highly desirable feature of the present invention is that the prime movers and generators may be accommodated in comparatively small areas of space, thus providing ample room for the attendants to operate and inspect the various apparatus mounted upon the frame C. It will, moreover, be apparent to those skilled in the art that, owing to the arrangement described, the weight of the prime movers and generators will be correctly distributed upon the supporting devices, thus assuring a good balance and, consequently, maximum traction.

As is well known, the factor that is chiefly responsible for the difficulties encountered in the matter of effecting a suitable arrangement of the prime movers and auxiliary devices of a self-contained electrically driven locomotive is the necessarily restricted space of the locomotive platform or frame upon which these elements are mounted. This is particularly true with regard to its width which is, of course, determined by the width of tunnels, the spacing of signalling and switching devices with respect to the track, and other well known considerations.

As has been previously pointed out it is a desideratum to conserve cab space in order to assure accessibility to the various power devices of the locomotive and, therefore, to assure maximum width of areaways, aisles and such other spaces through which the attendants are required to move in caring for and operating the power apparatuses. In the form of the invention previously described a close approach to this result is obtained by placing the prime movers as closely together as is possible, although the adjacent cylinders of the several prime movers lie in the same transverse planes.

It is herein contemplated to so dispose the cylinders as to further reduce the width of an engine casing, designated in the modified form of the invention illustrated in Figure 4, as *e*, and thus add to the width of the aisles *f* between the sides of the engine casing *e* and the frame C.

The manner in which this is accomplished consists in arranging the cylinders T, of the several groups, designated by *g* and *h*, in staggered fashion so that the transverse median line of one cylinder of a group falls substantially between a pair of adjacent cylinders of the other group. In this way a cylinder of each group will lie closely adjacent the end of the casing *e*. By arranging the cylinders in the manner described the crank-throws *j* of the several crank shafts V will be staggered with respect to each other, that is, a crank-throw *j* of one crank shaft will lie in the same transverse plane as a main bearing of the other crank shaft. In consequence of this arrangement the rows of cylinders T and, therefore, the crank shafts V may be arranged in closely spaced relation with respect to each other, and the sides of the engine casing *e* will fall closely to the longitudinal center line of the locomotive.

In this modification, as in that previously described, the generators O are arranged at opposite ends of the casing *e*. Each generator is in axial alignment with the crank shaft V and connected thereto by a coupling *c*.

I claim:

1. A power unit for locomotives and the like comprising a pair of independently operable engines having separate crank shafts enclosed in a common casing, the cylinders of one engine being staggered with respect to the cylinders of the other engine to permit parallel arrangement of the engines with a minimum width requirement.

2. A power unit for locomotives and the like comprising a pair of independently operable engines having separate crank shafts enclosed in a common crank case, the cylinders of one engine being staggered with respect to the cylinders of the other engine to permit the positioning of the crank throws of one crank shaft opposite to the main bearings of the other crank shaft.

3. A power unit for locomotives and the like comprising two separately operable internal combustion engines having separate crank shafts enclosed in a common casing, said crank shafts having a main bearing between each crank throw, said engines being so arranged with respect to each other that the crank throws of each shaft shall be opposite the main bearings of the other shaft whereby the cylinders may be more closely spaced in transverse relationship.

BERTRAM G. VALENTINE.